Figure 1:
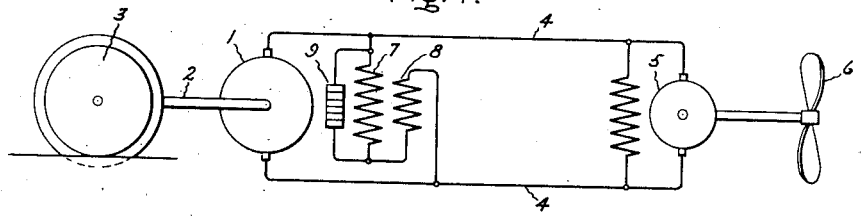

Feb. 12, 1935. M. A. WHITING ET AL 1,990,766

DYNAMO ELECTRIC MACHINE REGULATION

Filed Aug. 27, 1932 2 Sheets-Sheet 1

Inventors:
Max A. Whiting,
Robert S. Thurston,
by Charles E. Tullar
Their Attorney.

Inventors:
Max A. Whiting,
Robert S. Thurston,
by Charles E. Tullar
Their Attorney.

Patented Feb. 12, 1935

1,990,766

UNITED STATES PATENT OFFICE 1,990,766

DYNAMO-ELECTRIC MACHINE REGULATION

Max A. Whiting and Robert S. Thurston, Schenectady, N. Y., assignors to General Electric Company, a corporation of New York Application August 27, 1932, Serial No. 630,708

8 Claims. (Cl. 171—223)

Our invention relates broadly to dynamo-electric machine regulation and more particularly to improvements in axle driven generator systems.

It is well known that variation in speed of an ordinary direct current generator causes corresponding variations in its voltage. In some applications of variable speed direct current generators, such for example as car axle driven generators, the speed variation is so wide that the corresponding voltage variation is so great as to require the use of some kind of regulating means for the voltage in order that load devices operated by the generator may operate properly over the entire range of speed.

In Patent No. 1,916,072, granted on June 27, 1933, to W. K. Rankin, and assigned to the assignee of the present application, there is disclosed a regulating arrangement for variable speed direct current generators comprising a shunt circuit for the generator consisting of a differential field winding and a special negative resistance-current characteristic resistance element connected in series with the differential winding. The differential field winding cooperates with a main shunt field winding in such a manner that as the voltage of the generator increases the disproportionately increased current through the differential field winding, as a result of the decrease in resistance of the negative resistance-current characteristic element as the voltage of the generator increases, reduces the net ampere-turns produced by both of the field windings and consequently acts to regulate the voltage of the generator.

In our present arrangement we provide an inherently regulated excitation arrangement for a variable speed direct current generator which consists of shunt connected main and differential field windings for the generator, connected in series with each other, and a negative resistance-current characteristic element connected in parallel with the main field winding.

The application of our invention in which we are particularly interested, at the present time, is to axle driven direct current generators for operating a direct current motor which is connected to a fan, or blower, for circulating the air in a refrigerator type freight car. It has been found that in an ordinary refrigerator type freight car, in which no means is provided for circulating the air, that temperature stratification results so that there is roughly a ten degree difference in temperature between the top and bottom of the car. This sometimes causes spoilage of certain kinds of freight, such as bananas, which is stored near the top of the car.

It is practically necessary that a system, such as is outlined in the paragraph above, be extremely rugged, simple and reliable in operation because it is not practical to provide a freight car with an electrical system requiring any considerable maintenance.

An object of our invention is to provide a new and improved voltage regulating arrangement for variable speed direct current generators.

Another object of our invention is to provide a simple and rugged voltage regulating arrangement, for variable speed direct current generators, requiring no auxiliary moving parts. A further object of our invention is to provide a new and improved axle driven type generator system.

Our invention will be better understood from the following description taken in connection with the accompanying drawings and its scope will be pointed out in the appended claims.

Figure 2:
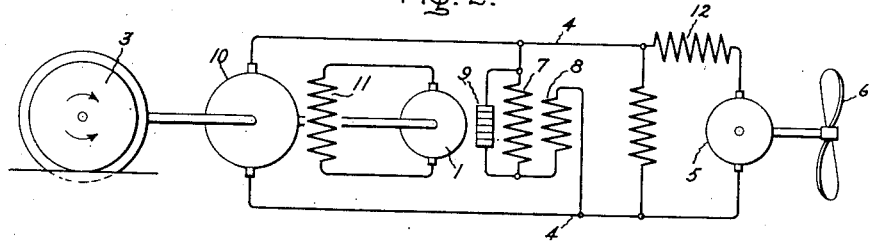
Figure 3:
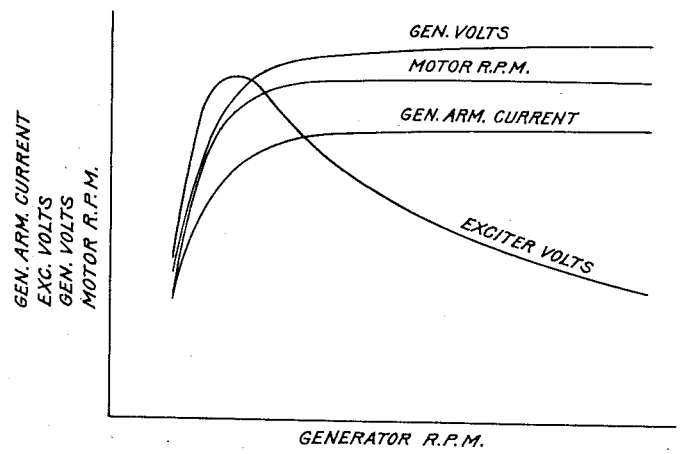
Figure 4:
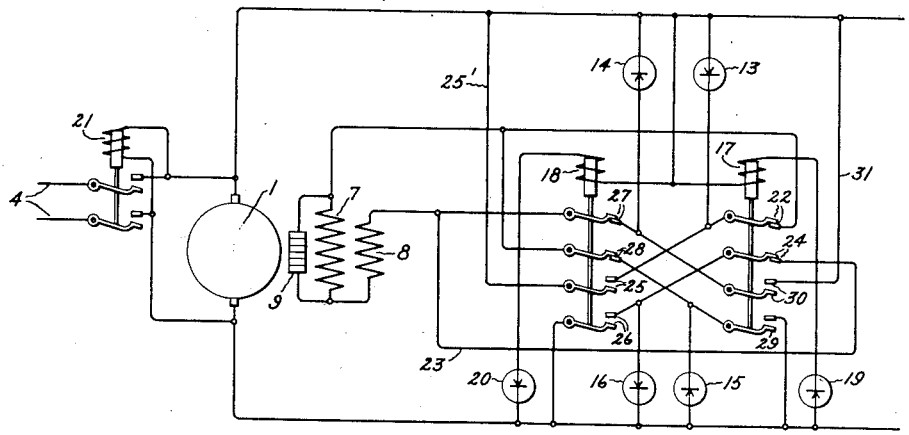
Figure 5:
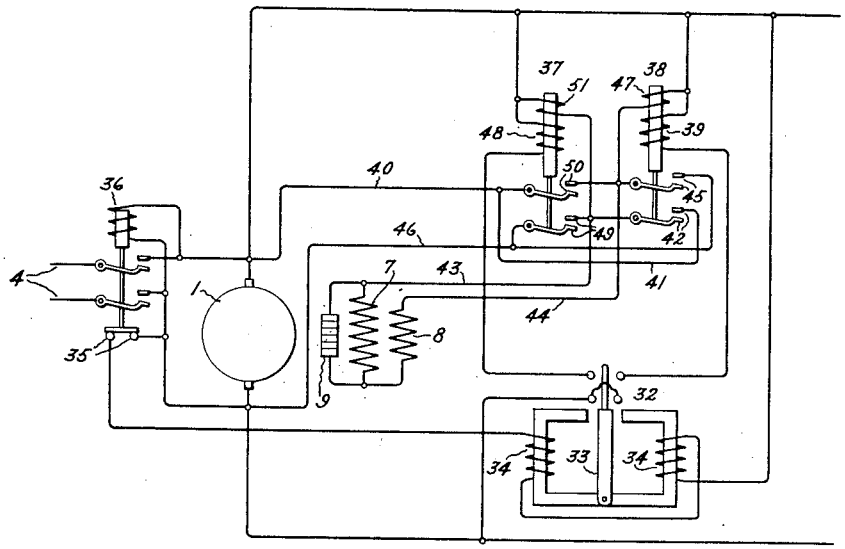

In the drawings, in which similar reference characters designate the same elements in the several figures, Fig. 1 represents diagrammatically a preferred embodiment of our invention as applied to an axle driven direct current generator for operating a fan motor; Fig. 2 illustrates diagrammatically our improved system embodying our regulating arrangement as disclosed in Fig. 1 combined with additional means for insuring that the generator will build up voltage for either direction of rotation; Fig. 3 is a set of curves showing the operating characteristics of the system illustrated in Fig. 2; Fig. 4 is a modified arrangement for insuring voltage build-up of the regulated generator, and Fig. 5 illustrates another modified arrangement for insuring voltage build-up of the regulated generator.

In Fig. 1 of the accompanying drawings 1 is a variable speed direct current generator which is arranged to be operated by any suitable means and as shown is directly connected to the axle 2 of a car wheel 3. Generator 1 is connected by means of circuit conductors 4 to a motor 5 for operating any suitable means, such as a fan 6. Motor 5 is preferably a shunt connected direct current motor which is operated below saturation, or, to be technically correct, below its maximum values of per cent saturation, although this is not necessary unless desired. The purpose of operating the motor below saturation is to make its speed relatively insensitive to any voltage variations.

Our arrangement for producing inherent voltage regulation of generator 1 consists of a main shunt field winding 7 connected in series with a differential shunt field winding 8. Connected in parallel with main field winding 7 is a negative current-resistance characteristic resistance device 9.

Device 9 is preferably composed of the special resistance material which is disclosed and claimed in Patent No. 1,822,742, granted September 8, 1931 on an application of K. B. McEachron and assigned to the assignee of the present application. This material has the property of reducing its electrical resistance instantaneously and exponentially with increases in applied voltage across it or current density through it, or both. Furthermore, this change in resistance is substantially independent of changes in its temperature so that regulating arrangements depending for their operation on the change in resistance of such a material are not affected by changes in ambient temperature. Furthermore, the instantaneously acting feature of this resistance material makes it particularly valuable in regulating systems, as the speed of operation of such systems is increased by the use of such material.

The operation of the arrangement illustrated in Fig. 1 is as follows: Assume that the speed of car wheel 3 has just increased, thereby increasing the speed of operation of generator 1. This increase in speed at first produces an increase in voltage of the machine 1 with the result that an increased voltage is impressed across the combination of the two field windings 7 and 8 and the negative resistance current characteristic device 9. This increase in voltage produces an increased current flow through all of these elements with the result that the following compound action takes place. The increased current through resistance device 9 decreases its resistance thereby decreasing the resistance of the parallel combination of field winding 7 and resistance 9. This causes a disproportionately large increase in current to flow through the differential field winding 8 thereby producing a reduction in the net ampere turns produced by both field windings of the generator 1. At the same time as the resistance 9 decreases in value the division of the total current in differential winding 8 between the main field winding 7 and resistance 9 changes so that a greater proportion of the current flows through resistance 9 and a lesser proportion flows through the main field winding 7. This also has an effect tending to reduce the net field ampere turns of the generator 1. By properly choosing the resistance and the number of turns of the main and differential field windings, and the characteristics of the negative resistance-current characteristic device, it is possible actually to reverse the direction of excitation by steadily increasing the voltage of the generator.

However, in Fig. 1 it is preferable to reduce the net excitation of generator 1 with increase in voltage in such a manner that the voltage is maintained substantially constant over a wide range of operating speed. The arrangement is so sensitive that very small changes in voltage of generator 1 will produce relatively large changes in the net ampere turns of the field winding.

Obviously a reduction in speed of the generator 1 will reduce its voltage and will cause the regulating arrangement to increase the net excitation of the generator in such a manner as to maintain its voltage substantially constant.

As an ordinary generator, which is self excited, will not build up voltage when its direction of rotation is reversed because the machine cannot itself reverse its residual magnetism, it is necessary, in practical cases, to provide auxiliary means for insuring voltage build-up of reversibly driven direct current generators.

In Fig. 2 is shown a combination arrangement, utilizing the principles of the regulating arrangement shown in Fig. 1, for insuring voltage build-up regardless of the direction of rotation. The particular arrangement for securing voltage build-up of a reversibly driven generator, which is shown in Fig. 2, is disclosed in Patent No. 1,974,990, granted December 25, 1934, upon an application of F. B. Hornby and assigned to the assignee of the present application. In the combination arrangement shown in Fig. 2 generator 1 is arranged to act as an exciter for a main generator 10. As shown, this generator 10 has a field winding 11 which is connected across the terminals of generator 1, which is now acting as an exciter. Main generator 10 in turn acts to energize the regulating excitation system of exciter 1 which consists of the main shunt field winding 7, the differential shunt field winding 8 and the negative resistance current characteristic resistance device 9. This regulating excitation combination is shown connected across generator 10.

In the operation of the arrangement shown in Fig. 2 the voltage regulating arrangement operates in principle exactly as it does in Fig. 1. Thus, assume that wheel 3 is rotating in a given direction and that its speed has just increased. Under these circumstances the voltage of exciting generator 1 will increase, thereby increasing the excitation of generator 10 which in turn will have its voltage increased due to the double effect of the increase in speed and the increase in excitation. This increase in voltage acting on the regulating excitation combination for exciting generator 1 will reduce its excitation sufficiently to regulate its voltage. Due, however, to the fact that merely holding the voltage of exciting generator 1 constant with changes in speed will not hold the voltage of generator 10 constant with changes in speed, it is necessary to arrange the excitation regulating arrangement for exciting generator 1 in such a manner that its voltage actually decreases with increases in its speed. In this manner, the excitation of the field winding 11 for generator 1 may be made to decrease sufficiently, with increases in speed, to hold the voltage of the main generator 10 substantially constant with variations in speed over a relatively wide range.

This operation is shown by the curves shown in Fig. 3. In this figure the curve labeled "Exciter Volts" shows how the voltage of exciting generator 1 decreases with increases in its speed. The curve labeled "Generator Volts" shows that over a relatively wide range of operating speed the output voltage of generator 10 remains substantially constant. Due to the fact that the voltage of generator 10 remains substantially constant the speed of motor 5 also is substantially constant over a wide range as shown by the curve labeled "Motor R. P. M." Due to the fact that both the motor's speed and applied voltage are substantially constant it also follows that the motor current will also be substantially constant over a wide range of generator speed. This is shown by the curve labeled "Generator Armature Current", which current is also the motor current.

The operation of the arrangement shown in Fig. 2 for giving inherent self-excited voltage build-up regardless of the direction of rotation is as follows: Assume that the direction of rotation reverses with respect to the direction in which the machines have just been described as being operated. The polarity of each of the machines 1 and 10 will now reverse due to the combined effect of the original residual magnetism in each machine and the reverse direction of rotation. One of the two machines is bound to have a stronger residual magnetism than the other and consequently this reversal of voltage of the stronger machine will reverse the residual magnetism in the other machine. Assume for example, that exciting generator 1 has a stronger residual magnetism than generator 10 and consequently that as the machines start operating in reverse direction the generator 10 has its residual magnetism reversed. As soon as this happens generator 10 will start to build up voltage with the same polarity as it had originally because both its field excitation and its direction of rotation have been reversed. The result is that this build-up of voltage of generator 10 will increase the excitation of exciting generator 1 in the same relative direction as originally and consequently this generator will now continue to build up with its polarity reversed. Consequently, each of the machines will excite the other and they will build up to normal voltage. From the above it will be seen that by insuring that exciter 1 has a stronger residual magnetism than generator 10 it is possible always to cause generator 10 to build up with the same polarity. However, if polarity is unimportant, it is not necessary to insure this particular relation of residual magnetism of the two machines.

In Fig. 2 we have also shown motor 5 as provided with an auxiliary series field winding 12 for the purpose of insuring reasonable speed regulation with changes in load.

In Fig. 4 is shown an alternative way of insuring automatic voltage build-up of generator 1 regardless of its direction of rotation. Broadly speaking, this arrangement consists of a Wheatstone bridge connection of four unidirectional current conducting devices with two opposite terminals of the bridge connected across the terminals of generator 1 and the remaining two terminals of the bridge having the regulating excitation scheme, consisting of the main and differential field windings 7 and 8 and the negative resistance current characteristic element 9, connected between them. In addition to the above arrangement it is preferable, in the interests of reliability, to provide auxiliary means for taking the unidirectional conducting devices out of circuit after the generator has built up a sufficient voltage. This is because the unidirectional conducting devices may fail, or their resistances may change, with the result that the arrangement would become inoperative. The unidirectional conducting devices may be of any well known type, such for example, as of the well known copper oxide type rectifiers.

As shown in Fig. 4, the bridge circuit is composed of half wave rectifying devices 13, 14, 15 and 16, and the auxiliary means for taking the rectifying devices out of circuit after predetermined operating conditions are attained consists of relays, or contacts, 17 and 18, which are made responsive to the polarity of generator 1 by connecting them across this generator through unidirectional conducting devices, or rectifiers, 19 and 20, respectively.

In addition to the above means for securing automatic build-up of the generator 1, an auxiliary relay 21 is provided for facilitating build up of generator 1. This relay consists of a voltage responsive winding and a set of contacts for maintaining the load circuit of generator 1 open until the open circuit voltage of the generator reaches a predetermined value. This facilitates voltage build-up of the generator in cases where the load circuit has a very low resistance.

The operation of the polarity responsive means for insuring build-up of generator 1, which is shown in Fig. 4, is as follows: Assume that generator 1 is operated in such direction that the voltage produced by its residual magnetism is of such polarity that its upper brush is positive and its lower brush is negative. Assume further that the arrowheads used in the designations of the unidirectional current conducting devices indicate the direction of their conductivity. Under these assumed conditions the field current for generator 1 will flow through rectifier 13, a pair of contacts 22 on relay 17, the field windings 7 and 8 and the resistance 9, a conductor 23, a pair of contacts 24 on relay 17 and through rectifier 16 to the other side of the generator. No current will flow through rectifiers 14 and 15 because of the direction in which they are connected with respect to the polarity of the machine at the present time. After the voltage of generator 1 reaches a predetermined value sufficient current will flow through the operating winding of relay 18 and the rectifier 20 to cause the actuation of this relay. Actuation of relay 18 causes a set of contacts 25 to close thereby short circuiting rectifier 13 through a conductor 25'. At the same time, a pair of contacts 26 on relay 18 are closed and these contacts short circuit the rectifier 16. Relay 18 is also provided with sets of contacts 27 and 28 which are in a circuit including rectifiers 14 and 15, to which an inverse voltage is applied under the operating conditions described above. However, when relay 18 is actuated contacts 27 and 28 open thereby removing the inverse voltage from rectifiers 14 and 15 so that they will not be under an electrical strain during the normal relatively high voltage operating condition.

The operation of this arrangement when the direction of rotation of generator 1 reverses is substantially the same as has been described above. Briefly stated it is as follows. If the direction of operation of generator 1 reverses the voltage produced by its residual magnetism will be of reverse polarity thereby making the lower brush positive and the upper brush negative. Before this happens, however, it should be stated that the voltage of the generator must pass through zero and consequently relay 18 will be restored to the position shown in the drawings. As the generator 1 builds up with reverse polarity produced by its residual magnetism, current will flow through rectifier 15, contacts 28 of relay 18, the field windings 7 and 8 in the same direction as heretofore, through contacts 27 of relay 18, and back to the other side of the generator through rectifier 14. It will thus be seen that although the polarity of generator 1 has reversed, its residual magnetism has not been reversed and its field windings will be energized in the same direction as heretofore. Consequently the generator will build up and after its voltage reaches a predetermined value the current flow through rectifier 19 and the operating winding of relay 17 will be sufficient to actuate this relay. The actuation of relay 17 causes a pair of contacts 29 thereon to close, thereby short circuiting rectifier 15. At the same time, an additional pair of contacts 30 on relay 17 close and these contacts short circuit rectifier 14 through a conductor 31. The opening of the contacts 22 and 24 of relay 17 when it is actuated breaks the circuit which applies an inverse voltage to the rectifiers 13 and 16 and consequently these rectifiers will not be under electrical stress during normal operating conditions.

In Fig. 5 is shown an alternative way of securing voltage build-up of generator 1 regardless of its direction of rotation. This arrangement makes use of a polarity responsive relay such as polarized relay. The polarity responsive relay in turn controls the energization of a pair of relays, or contactors, for changing the connections of the excitation circuit of generator 1 so that current will always flow through it in the same direction regardless of the polarity of the generator. The polarized relay may be of any of the well known types and it is illustrated diagrammatically as a relay 32 having a polarized, or permanent magnetic, armature member 33 and an electromagnetic exciting winding 34 connected across the generator 1 through a set of back contacts 35 on a relay 36. Relay 36 is similar to relay 21 in Fig. 4 and serves to maintain the load circuit on generator 1 open until its voltage has built up to a predetermined value. Contacts 35 are arranged to be closed below this predetermined value of voltage and to open when relay 36 is actuated. Under the control of polarized relay 32 are a pair of relays, or contactors, 37 and 38 having contacts 49 and 50, and 42 and 45, respectively, which are the equivalent of a reversing switch, or a Wheatstone bridge arrangement of rectifiers, and which act to insure that the current flow through the field windings 7 and 8 is always in the same direction regardless of the polarity of generator 1.

The operation of the arrangement shown in Fig. 5 is as follows: Assume that generator 1 is being operated in such a direction that the voltage produced by its residual magnetism makes the upper brush positive and the lower brush negative. Assume further that with this polarity the polarized relay will respond in such a manner as to close its right hand contacts and thereby energize an operating coil 39 for relay 38. This relay will now pick up thereby closing the energizing circuit for the field windings 7 and 8 of generator 1 as follows: From the upper, or positive, brush of generator 1, through a conductor 40, an additional conductor 41, a pair of contacts 42, a conductor 43, field windings 7 and 8, a conductor 44, a pair of contacts 45, and through a conductor 46, to the other side of the generator 1. At the same time, a circuit is completed from the positive side of generator 1 through a holding coil 47 on relay 38, contacts 45 of this relay to the negative side of the generator 1. As soon as the voltage of generator 1 reaches a predetermined value the relay 36 will pick up, thereby breaking the energizing circuit for the polarized relay so that this relay will not be subjected continuously to the full voltage of the generator 1.

Assume now that the direction of rotation of generator 1 reverses thereby reversing the voltage produced by its residual magnetism. It should be understood that as soon as the direction of rotation reverses the speed of generator 1 must pass through zero thereby reducing its voltage to zero and causing the relays 36 and 38 to drop out. As soon as the generator 1 starts operating in the reverse direction its polarity will reverse thereby causing polarized relay 32 to close its left hand set of contacts which will complete an energizing circuit for an operating coil 48 on relay 37. As soon as relay 37 picks up the energizing circuit for the field windings 7 and 8 will be completed as follows: From the lower and now positive brush of the generator through conductor 46, a set of contacts 49 on relay 37, conductor 43, field windings 7 and 8 in the same direction as heretofore, through conductor 44, and a pair of contacts 50 on relay 37, and back to the upper and now negative brush of the generator 1 through conductor 40. At the same time a circuit will be completed for a holding coil 51 on relay 37 through the contacts 49 of this relay. These contacts in effect connect the holding coil 51 across the generator. As soon as the voltage of generator 1 reaches its predetermined value the relay 36 picks up thereby breaking the contacts 35 and deenergizing polarized relay 32.

While we have shown and described particular embodiments of our invention, it will be obvious to those skilled in the art that changes and modifications may be made without departing from our invention and we therefore aim in the appended claims to cover all such changes and modifications as fall within the true spirit and scope of our invention.

What we claim as new and desire to secure by Letters Patent of the United States, is:

1. In combination, a direct current generator, a pair of opposed field windings for said generator connected in series across a circuit whose voltage is dependent on the voltage of said generator, and a resistance whose value decreases instantaneously in an exponential manner with increases in current therethrough and whose value is substantially independent of temperature variations connected in parallel with one of said windings.

2. In combination, a direct current generator, a main shunt field winding therefor, a differential field winding connected in series with said main winding, and a resistance element whose resistance decreases instantaneously with increases in applied voltage and which is substantially independent of temperature connected in parallel with said main winding.

3. In combination, a direct current generator, means operable over a wide range of speed for driving said generator, a main shunt field winding for said generator, a differential field winding connected in series with said main field winding, and an instantaneously acting negative current-resistance characteristic device connected in parallel with said main field winding.

4. In combination, a direct current generator, a field winding therefor, an exciter for energizing said field winding driven from said generator, a main field winding for said exciter connected across said generator, a differential field winding for said exciter connected in series with said main field winding, and a negative resistance-current characteristic resistance connected in parallel with said main field winding.

5. In combination, a car wheel, a direct current generator having a field winding, an exciter having a stronger residual magnetism than said generator connected to energize said field winding, means for driving said generator and said exciter from said wheel, a main field winding for said exciter connected across said generator, a differential winding for said exciter connected in series with said main winding, and a negative resistance-current characteristic resistance connected in parallel with said main winding.

6. In combination, a direct current dynamo-electric machine, a pair of series connected opposed field windings for said dynamo-electric machine adapted to be connected across a circuit whose voltage is dependent on the voltage of said machine, and a resistance whose value decreases instantaneously in an exponential manner with increases in current therethrough and whose value is substantially independent of temperature variations connected in parallel with one of said windings.

7. In combination, a direct current generator adapted to be operated over a relatively wide speed range, a field winding for said generator, a direct connected exciter for energizing said field winding, a pair of opposed field windings for said exciter connected across said generator, and a non-linear volt-ampere characteristic resistor connected in series relation with one of said opposed field windings so as to cause the voltage of said exciter to vary with speed in such a manner as to maintain the voltage of the generator substantially independent of speed.

8. In combination, a direct current generator adapted to be operated over a relatively wide speed range, a field winding for said generator, a direct connected exciter for energizing said field winding, a main field winding and a differential field winding for said exciter connected across said generator, a negative resistance-current characteristic resistor connected in series relation with said differential field winding, said resistor having such a characteristic that relatively slight changes in generator voltage cause such relatively large changes in the exciter differential field current as to cause the exciter voltage to vary inversely with sped by amounts sufficient to maintain the generator voltage substantially independent of speed.

MAX A. WHITING.
ROBERT S. THURSTON.